Patented Feb. 18, 1941

2,231,887

UNITED STATES PATENT OFFICE 2,231,887

CHEMICAL PROCESS

Rollin Francis Conaway, Wilmington, Del., assignor to E. I. du Pont de Nemours & Company, Wilmington, Del., a corporation of Delaware No Drawing. Application March 3, 1939,
Serial No. 259,678

4 Claims. (Cl. 260—326)

This invention relates to the preparation of unsaturated organic nitrogen compounds and more particularly to unsaturated nitrogen compounds containing a vinyl group directly attached to the nitrogen atom.

N-vinyl imides have been prepared by the pyrolytic decarboxylation and dehydrohalogenation of phthalyl-alpha-alanylchloride $$(C_8H_4O_2NCH(CH_3)COCl)$$

and by the dehydration of beta-hydroxy-ethyl-phthalimide $(C_8H_4O_2NCH_2CH_2OH)$ with phosphoric anhydride—(see M. Bachstez, Ber. 46, 3087 (1913) and C. A. 8, 126 (1914)). In addition there are several U. S. patents on the preparation of N-vinyl derivatives of heterocyclic secondary amines, such as pyrrole and its homologs and of secondary aryl amines, such as diphenylamine. These processes, however, due in general to the cost of the chemicals and the subsequent treatments, which are necessary to isolate the desired products, have proved to be of little real value commercially; moreover, in many cases the compounds are difficult to prepare and the yield of N-vinyl derivatives is relatively low.

This invention has as its object the preparation of N-vinyl compounds by a new and improved method which avoids the disadvantages of the prior art. Another object is to provide a commercially practical process for the preparation of N-vinyl imides. Still another object is to provide methods for preparing certain new and useful N-vinyl imides. Still another object is to provide a catalytic method for producing N-vinyl imides. Other objects will be apparent from the reading of the following description of the invention.

These objects are accomplished by reacting acetylene with imides, preferably in the liquid phase and at pressures in excess of atmospheric in the presence of mercuric salts as catalyts.

By the term "imide" as used in the specification and claims is meant a cyclic compound of the formula

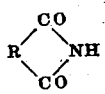

wherein R is a divalent organic radical. Imides may be considered as derived from cyclic anhydrides of dicarboxylic acids by replacing the oxygen atom separating the two carbonyl groups by the imido, >NH, group. (See Thorpe, Dictionary of Applied Chemistry, revised edition, 1922, vol. III, p. 583.)

The imides may conveniently be prepared by heating a dibasic acid or its anhydride with urea at atmospheric pressure until the water has been removed and then distilling the imide from the reaction mixture under reduced pressure. The crude imides prepared by this method contain an impurity which inhibits the reaction with acetylene, but the impurity can be removed either by recrystallization or by distilling the imide in the presence of a small amount of mercuric phosphate.

A convenient method for preparing the catalysts is by treating red mercuric oxide with an excess of the desired acid, washing the resulting mercuric salt with methyl alcohol to remove the excess acid, drying, and then pulverizing the resulting salt to a fine powder.

In the practice of this invention the imide is charged into an autoclave fitted with agitating and temperature controlling means and acetylene passed in under pressure until the reaction is complete. After the reaction is complete the autoclave is discharged and the N-vinyl imide separated from the reaction mixture by distillation under reduced pressure.

The following examples will illustrate the invention more fully.

Example 1

One hundred fifty grams of succinimide and 20 grams of mercuric phosphate were intimately mixed and placed in a thermostatically controlled agitated high pressure bomb. The air in the bomb was displaced several times with acetylene and the bomb then heated to 150° C. The acetylene pressure was increased to 225 pounds per square inch as soon as the temperature reached 150° C. As the reaction progressed and additional acetylene passed into the bomb under pressure from time to time, the temperature was allowed to decrease progressively to 60° C. Thirty-two grams of acetylene was absorbed by the reaction mixture in the course of 4 hours. The reaction mixture was distilled at 2 mm. pressure. One hundred grams of N-vinyl succinimide $$\begin{array}{c} CH_2-CO \\ | \quad\quad\quad\quad >NCH=CH_2 \\ CH_2-CO \end{array}$$

was obtained, distilling at 98° to 102° C. and melting at 45° C.

Example 2

Six hundred grams of succinimide were mixed intimately with 60 g. of mercuric phosphate and placed in the high pressure bomb of Example 1. The reaction mixture was heated to 175° C. in order to obtain a uniform melt, and the initial acetylene pressure adjusted to 225 pounds per square inch. The reaction temperature was decreased to 130° C. as soon as the acetylene pressure started to decrease. During the course of 6 hours 140 grams of acetylene was absorbed, the reaction mixture was dissolved in acetone, filtered, and distilled under 2 mm. pressure. Three hundred twenty-five grams of N-vinyl succinimide, distilling at 98° to 102° C., and 250 grams of unchanged succinimide distilling at 145° C. were obtained. This represents a yield of approximately 75% based on the succinimide consumed.

Example 3

Ninety grams of succinimide, 75 grams of acetone, 5 grams of mercuric phosphate, and 3 grams of mercuric sulfate were heated in the bomb of Example 1 at 65° C. for 12 hours under an acetylene pressure of 225 pounds per square inch. The reaction mixture was distilled at 2 mm. pressure and 42 grams of N-vinyl succinimide distilling at 98° to 102° C. were obtained.

Example 4

One hundred grams of Δ4-tetrahydrophthalimide, (prepared by heating urea with the acid anhydride obtained by condensing butadiene with maleic anhydride) and 15 grams of mercuric phosphate, were heated in the bomb of Example 1 at a temperature of 200° C. and an acetylene pressure of 250 pounds per square inch. The temperature of the reaction mixture was decreased to 150° C. after approximately 5 grams of acetylene had been absorbed. The reaction mixture absorbed 16 grams of acetylene in six hours. The resulting reaction mixture was dissolved in acetone, filtered, and distilled under 2 mm. pressure. Fifty grams of N-vinyl tetrahydrophthalimide

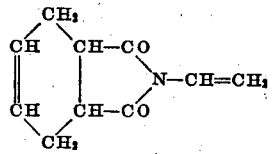

distilling at 128° to 132° C., and 20 grams of unreacted imide distilling at 165° to 170° C. under 2 mm. pressure were obtained.

Example 5

Two hundred grams of alpha-pentenylsuccinimide and 20 grams of freshly prepared mercuric phosphate were heated in the bomb of Example 1 at a temperature of 125° C. and an acetylene pressure of 250 pounds. Thirty grams of acetylene was absorbed by the reaction mixture over a period of four hours. The resulting reaction mixture was distilled under 10 mm. pressure. One hundred twenty grams of N-vinyl-alpha-pentenylsuccinimide

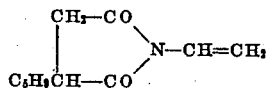

distilling at 147° to 150° C. and 50 grams of unreacted imide distilling at 168° to 172° C. were obtained.

Example 6

One hundred grams of beta-methylglutarimide and 10 grams of mercuric phosphate were heated in the bomb of Example 1 at a temperature of 150° C. and an initial acetylene pressure of 230 pounds per square inch. Acetylene was injected into the bomb from time to time and after six hours 32 grams of acetylene had been absorbed. The reaction mixture was distilled at 2 mm. pressure. Sixty-five grams of beta-methyl, N-vinylglutarimide

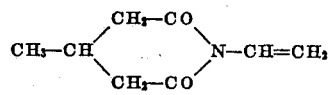

at 106° to 108° C. and 30 grams of unreacted imide distilling at 132° to 134° C. were obtained.

Example 7

Sixty grams of glutarimide and 8 grams of mercuric phosphate were heated in the bomb of Example 1 for six hours at a temperature of 200° C. and an acetylene pressure of 220 pounds per square inch. The reaction mixture was dissolved in acetone, filtered and distilled at 2 mm. pressure. Fifteen grams of N-vinylglutarimide

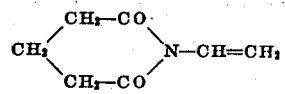

distilling at 128° to 132° C. and 20 grams of unreacted imide distilling at 151° to 155° C. were obtained.

Example 8

One hundred grams of purified phthalimide, 10 grams of mercuric phosphate and one gram of a 67% methyl alcohol solution of boron trifluoride were heated in the bomb at a temperature of 175° C. for four hours at an acetylene pressure of 250 pounds per square inch. The reaction mixture absorbed 20 grams of acetylene. The resulting crystalline reaction mixture was dissolved in benzene, filtered, and distilled under 2 mm. pressure. Fifteen grams of N-vinylphthalimide

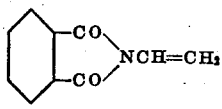

distilling at 155° to 160° C. were obtained. Considerable polymerization occurred during the distillation and the undistillable residue was a hard thermoplastic resin.

Example 9

One hundred grams of succinimide and 10 grams of mercuric salt of methane disulfonic acid were agitated in the bomb of Example 1 at a temperature of 150° C. for four hours at an acetylene pressure of 250 pounds per square inch. Forty-six grams of N-vinylsuccinimide was obtained when the reaction mixture was distilled at 2 mm. pressure.

Example 10

The above example was duplicated with analogous results using freshly precipitated mercuric sulfate and mercuric chloride, respectively, as the catalysts.

The processes of this invention are applicable to the preparation of N-vinyl imides generally. It is generally preferred, however, to use cyclic imides because of their greater reactivity with acetylene and ready availability.

In place of the cyclic imides of the examples, there may be used α-methyl succinimide, α,α'-dimethylsuccinimide, adipimide, dihydrophthalimide, 5,6,7,8-tetrahydronaphthalimide, methyl and ethyl-phthalimide, the imide of 2,3 naphthalic acid, etc. Open chain imides, e. g., mono- and polyimides may also be used but they are less preferred because of their lower reactivity with acetylene.

Mercuric phosphate appears to be the most effective catalyst, although mercuric sulfate, chloride, and methane disulfonate are also effective as catalysts. It is also possible to employ boron trifluoride along with the mercuric salts as catalysts. The concentration of catalyst may be varied widely, but the best results are obtained with catalysts in amounts in excess of 5% by weight based on the imide. The maximum amount of catalyst used is determined by practical considerations based chiefly on the cost of operation. From this point of view the upper limit may be set at about 25% by weight, based on the imide. Amounts far in excess of this of course may be used when the process is viewed merely from the point of view of chemical operativeness. Ordinary commercial acetylene may be used in the practice of this invention.

The reaction can also be carried out in the presence of organic diluents such as ketones, ethers, and hydrocarbons. The presence of diluents permits the reaction to be carried out at lower temperatures, but the diluents tend to decrease the rate of reaction. The reaction conditions can be varied widely and are determined largely by the physical properties of the imide and the pressure to which acetylene can be compressed at a given temperature without too great a risk of explosion. The temperature must be sufficiently high to maintain the reaction mixture in a molten form which varies from 50° C. for succinimide to 200° C. for the higher melting imides such as phthalimide. The acetylene pressure can vary from a few pounds to several atmospheres, depending on the temperature of the reaction and the type of equipment employed. If the equipment is designed to permit the dilution of the acetylene with an inert gas such as nitrogen, then the pressure can be increased to 25 to 30 atmospheres, but if the acetylene is not diluted the maximum pressure should preferably not exceed 250 pounds per square inch. This maximum pressure limit is merely the safe limit of operation in order to avoid possible explosive decomposition of the acetylene. Any pressure in excess of a few pounds may be considered as operative. The upper pressure limits, therefore, which have been set, are not critical when viewed in the light of producing an operative process but are merely set to indicate the conditions under which the process may be operated safely and without an undue explosive hazard.

Many different types of high pressure equipment such as bombs and autoclaves can be employed. It is advantageous to employ equipment which enables the reaction mixture to be agitated constantly and the temperature and pressure to be controlled accurately. The equipment should not contain a metal such as copper which forms an explosive compound with acetylene. The reaction can be carried out either by a partial or continuous process. In a continuous process portions of the reaction mixture are withdrawn continuously from the reaction vessel and additional imide and catalyst in a molten form are forced into the reaction chamber under pressure.

The monomeric N-vinyl imides in pure form are either colorless liquids or crystalline compounds which polymerize readily under the influence of heat, light, or peroxides as catalysts. The polymers are hard, tough, clear, thermoplastic, high-melting products which can be employed in films, coating compositions, and plastic materials in general. One of the most important uses for the N-vinyl compounds is in interpolymers, as the softening temperature of other vinyl polymers such as vinyl acetate and methyl methacrylate is increased greatly by interpolymerizing with N-vinyl imides. The polymeric N-vinyl imides such as N-vinyl-succinimide can also be hydrolyzed to polyvinyl amine products with different physical and chemical properties depending on the degree of hydrolysis.

The advantages of the invention are of an economical and practical nature. The methods described previously for preparing N-vinyl imides are based primarily on the decomposition of beta-substituted ethyl imides such as hydroxy- and acetoxy-ethyl imides. In many cases these compounds are difficult to prepare, the yield of N-vinyl imide obtained by the decomposition of the substituted ethyl imide at high temperatures is low, due to resinification, and in general the cost of the chemicals and subsequent treatments is much greater than involved in the method of this invention. The imides of organic dibasic acids may be prepared by any method well known to the art. For reasons of economy and ease of operation it is generally preferred to make them from the dibasic acid and urea. Acetylene is a relatively cheap chemical and the mechanical operations of treating imides in a liquid phase with acetylene under pressure are relatively simple. Furthermore, the yield of N-vinyl imides based on the imide consumed in the reaction is relatively high.

It is apparent that many widely different embodiments of this invention may be made without departing from the spirit and scope thereof and therefore it is not intended to be limited except as indicated in the appended claims.

I claim:

1. A process for the preparation of N-vinyl imides which comprises reacting acetylene with an amide in the liquid phase in the presence of a catalyst comprising as an essential catalytic component a mercury salt.

2. The process in accordance with claim 1 characterized in that the reaction is carried out under an acetylene pressure in excess of atmospheric.

3. The process in accordance with claim 1 characterized in that the catalyst comprises as its essential component mercuric phosphate.

4. A process which comprises reacting acetylene with a cyclic imide derived from a hydroaromatic dicarboxylic acid in the liquid phase in the presence of a catalyst comprising as an essential catalytic component a mercury salt.

ROLLIN FRANCIS CONAWAY.

CERTIFICATE OF CORRECTION.

Patent No. 2,231,887.   February 18, 1941.

ROLLIN FRANCIS CONAWAY.

It is hereby certified that error appears in the printed specification of the above numbered patent requiring correction as follows: Page 3, second column, line 55, claim 1, for the word "amide" read --imide--; and that the said Letters Patent should be read with this correction therein that the same may conform to the record of the case in the Patent Office.

Signed and sealed this 1st day of April, A. D. 1941.

(Seal)

Henry Van Arsdale,
Acting Commissioner of Patents